US007014452B2

(12) United States Patent
Lee

(10) Patent No.: US 7,014,452 B2
(45) Date of Patent: Mar. 21, 2006

(54) MOLD ASSEMBLY FOR MAKING PAPER PRODUCTS

(75) Inventor: Vincent Lee, Taipei (TW)

(73) Assignee: EPPSI Corp., Taipei (TW)

( * ) Notice: Subject to any disclaimer, the term of this patent is extended or adjusted under 35 U.S.C. 154(b) by 481 days.

(21) Appl. No.: 10/434,786

(22) Filed: May 8, 2003

(65) Prior Publication Data

US 2004/0224048 A1 Nov. 11, 2004

(51) Int. Cl.
*B29C 35/00* (2006.01)

(52) U.S. Cl. ...................... 425/407; 402/412; 402/422; 402/437; 402/388

(58) Field of Classification Search ................ 425/407, 425/412, 422, 437, 388, 468; 249/122; 162/220, 162/228, 358

See application file for complete search history.

(56) References Cited

U.S. PATENT DOCUMENTS

| | | | | |
|---|---|---|---|---|
| 2,105,593 | A * | 1/1938 | Hatton | 162/396 |
| 2,980,183 | A * | 4/1961 | Wells | 162/416 |
| 6,461,480 | B1 * | 10/2002 | Otakura et al. | 162/220 |
| 6,576,089 | B1 * | 6/2003 | Sato et al. | 162/227 |
| 6,860,461 | B1 * | 3/2005 | Otani et al. | 249/113 |

* cited by examiner

*Primary Examiner*—James P. Mackey
*Assistant Examiner*—Thu Khanh T. Nguyen

(57) ABSTRACT

A mold assembly includes a top mold with a female mold and a lower mold with a male mold that is moved to match with the female mold. The female mold includes a first core received in a recess in an inner periphery of the female mold and a second core received in a recess of the first core. A plurality of paths is defined through the female mold and respectively communicates with escape notches defined in the first core and the second core. Gaps are defined between the female mold, the first core and the second core respectively and the escape notches are in communication with the gaps such that only annular flanges are formed at edges of the paper products that have smooth surfaces. Each of the female mold and the male mold has a heating device for dehydrating the paper products.

2 Claims, 5 Drawing Sheets

MOLD ASSEMBLY FOR MAKING PAPER PRODUCTS

FIELD OF THE INVENTION

The present invention relates to a mold assembly for making paper products having uniform thickness and only flanges located at the boundary between cores of the mold assembly.

BACKGROUND OF THE INVENTION

A conventional mold assembly for making paper products, such as paper bowls and paper cups, generally includes a top mold with a female mold and a lower mold with a male mold which matches a concavity in the female mold. Paper material is filled between a gap between the inner periphery of the concavity and the male mold. There are several tiny paths defined in the top mold and communicating with the female mold so as to provide negative pressure so suck the paper product from the male mold to the inner periphery of the concavity of the female mold. The paper product is then shifted to another place to dry it up. It is noticed that the positions where the paths are located will cause bumps and/or thinner areas on the paper products because of the suction. This reduces the durability of the products. Besides, before the paper product is completely dried, it is shifted to be heated will also make the surface of the paper product be rough.

The present invention intends to provide a mold assembly for making paper products wherein the paths are located at the boundary surfaces between the cores and the female mold so that the paper product has annular flanges at ridges thereof rather than at the surface.

SUMMARY OF THE INVENTION

In accordance with one aspect of the present invention, there is provided a mold assembly that has a top mold having a driving device and a female mold is connected to the top mold. A plurality of paths is defined through the female mold and a concavity is defined in the female mold. A first core is connected to a recess in an inner periphery of the concavity of the female mold and a second core is connected to a recess defined in the first core. A gap is defined between the female mold and the first core and between the first core and the second core. The gaps are located in communication with the concavity. The paths communicate with escape notches in the first core and escape notches in the second core. The escape notches in the first core and the escape notches in the second core are respectively in communication with the gaps. A lower mold has a male mold that is matched with the female mold.

The present invention will become more obvious from the following description when taken in connection with the accompanying drawings that show, for purposes of illustration only, a preferred embodiment in accordance with the present invention.

DETAILED DESCRIPTION OF THE PREFERRED EMBODIMENT

Figure 1:
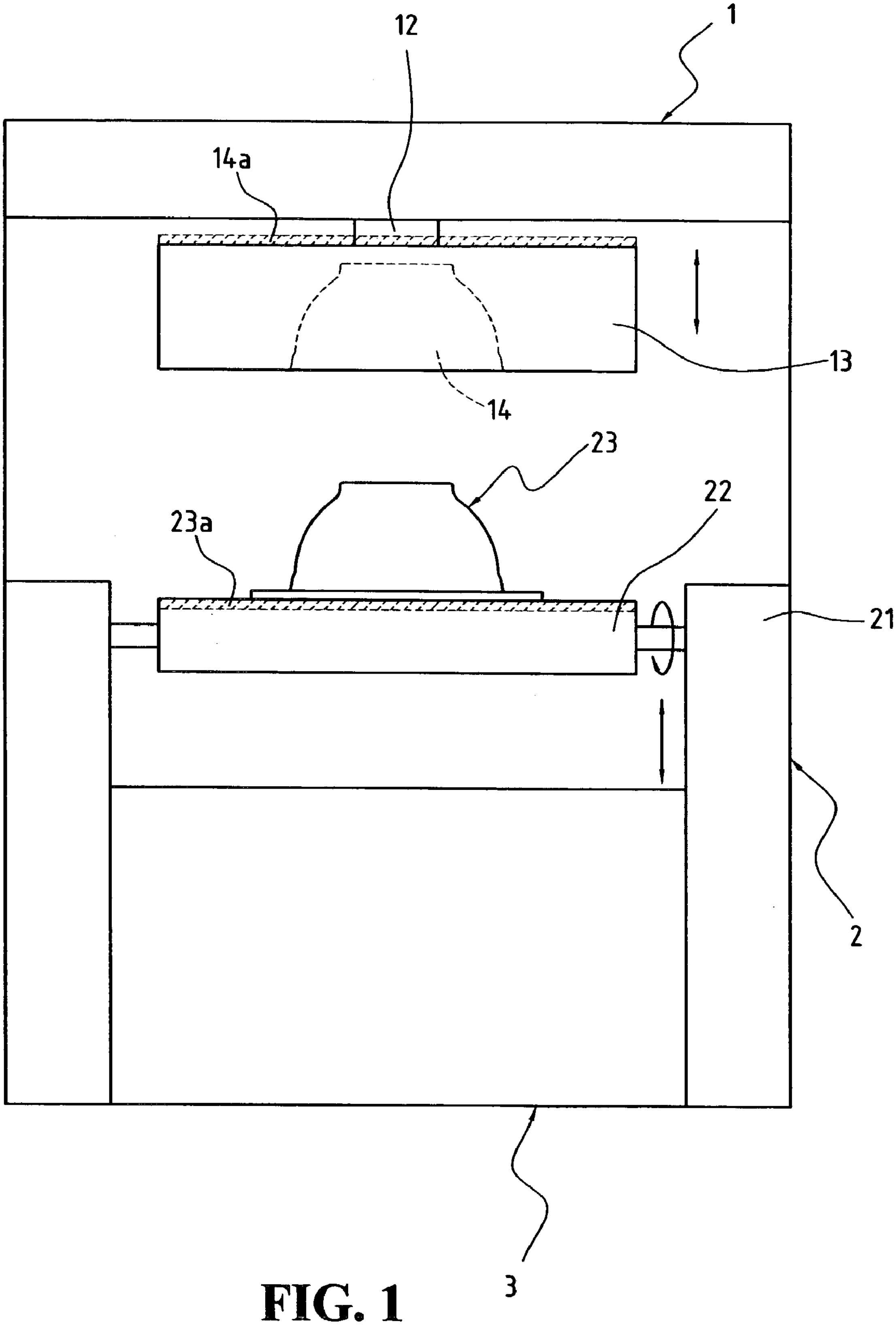
FIG. 1 shows an arrangement of a top mold and a lower mold of a mold assembly of the present invention.
Figure 2:
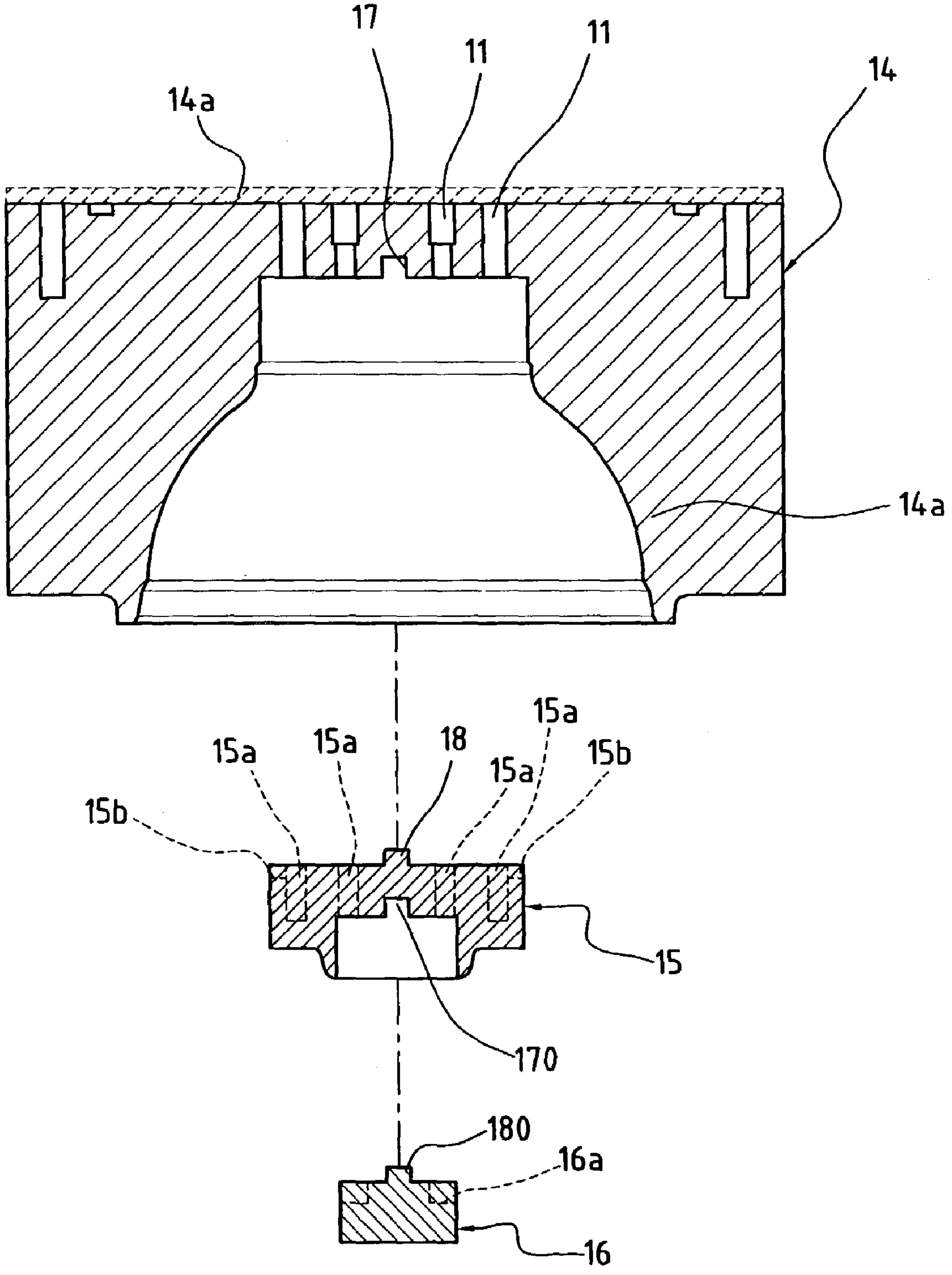
FIG. 2 is an exploded view showing a female mold, a first core and a second core.
Figure 3:
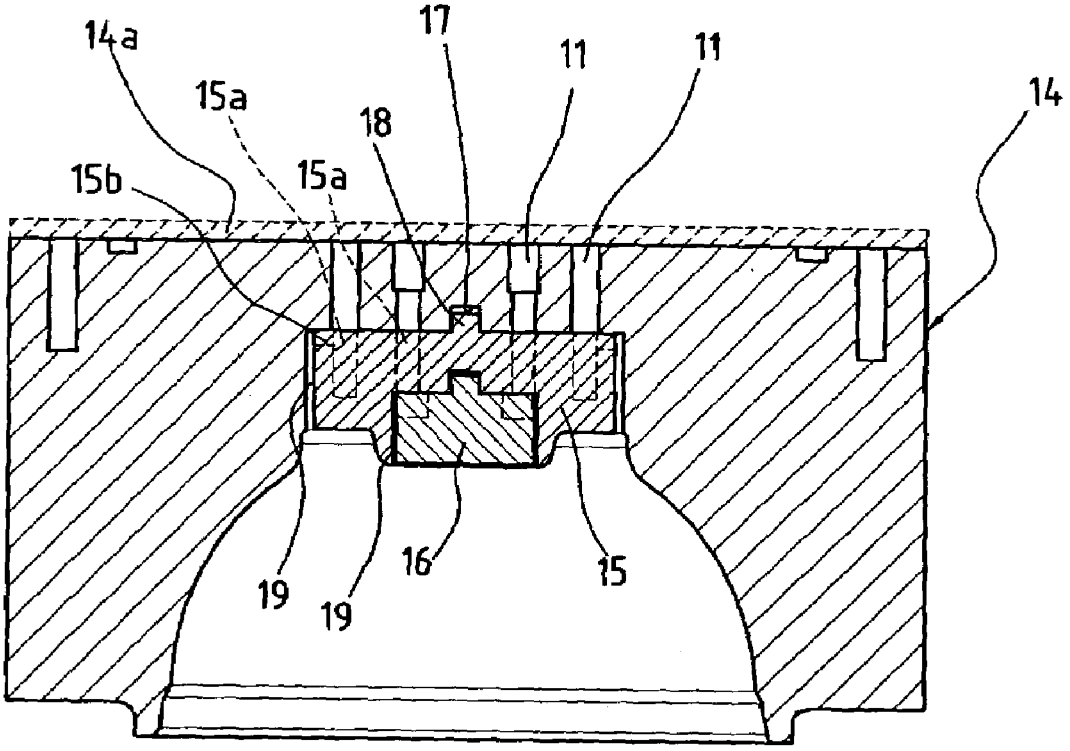
FIG. 3 is a cross-sectional view showing the assembly of the female mold, the first core and the second core.

Referring to the drawings and in particular to FIGS. 1–3, a mold assembly constructed in accordance with the present invention comprises a top mold 1 having a top mold frame 13. A driving device 12 is connected to the top mold frame 13 in which a female mold 14 is connected. A plurality of paths 11 is defined through the female mold 14. A concavity is defined in the female mold 14 and the paths 11 are in communication with the concavity. A first core 15 is connected to a recess in an inner periphery of the concavity of the female mold 14 by inserting a protrusion 18 on the first core 15 into a notch 17 defined in an inner periphery of the recess. A plurality of paths 15*a* is defined in a top of the first core 15. A plurality of escape notches 15*b* is radially defined in the first core 15 and communicates with the paths 15*a* in the first core 15.

A second core 16 is connected to a recess defined in the first core 15 by inserting a protrusion 180 on the second core 16 into a notch 170 defined in an inner periphery of a recess in the first core 15. A plurality of escape notches 16*a* is radially defined in the second core 16. The paths 11 are in communication with the paths 15*a* and some of the paths 15*a* are in communication with the escape notches 16*a* in the second core 16.

Figure 4:
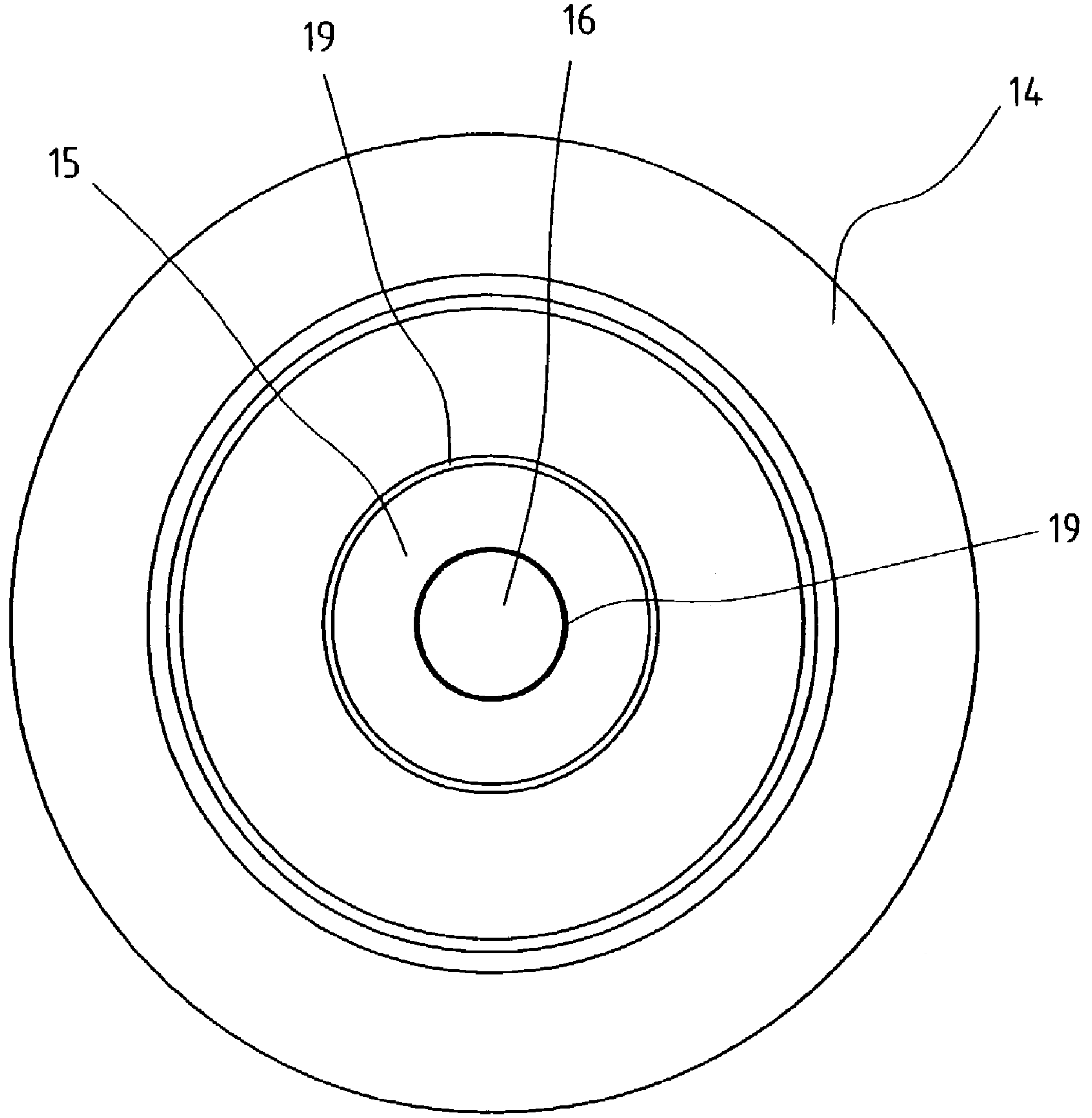
FIG. 4 shows gaps defined between the female mold, the first core and the second core.
Figure 5:
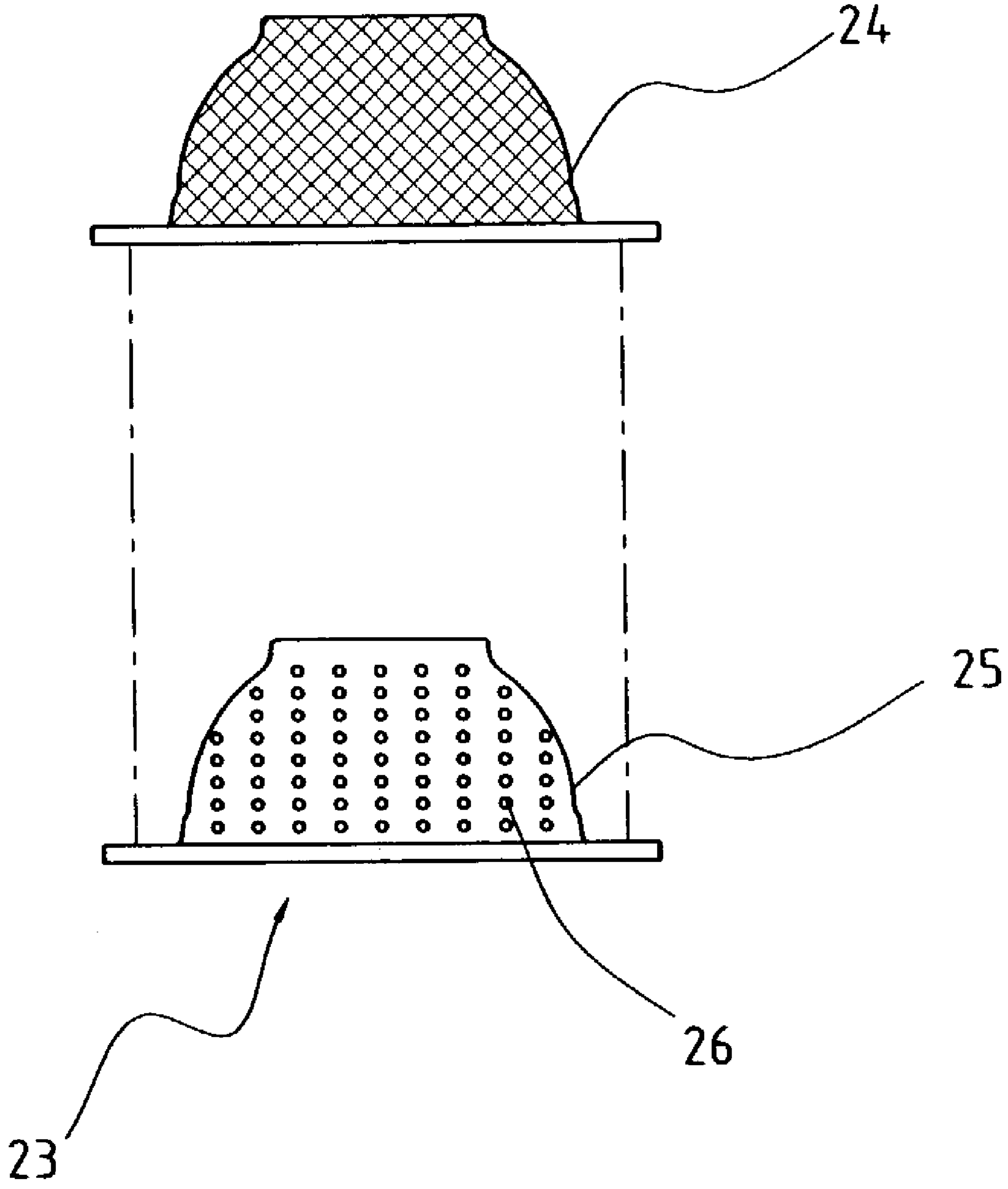
FIG. 5 shows the male mold including a netted cover and a porous inner core.

Further referring to FIG. 4, a gap 19 is defined between the female mold 14 and the first core 15, and between the first core 15 and the second core 16. The gaps 19 are located in communication with the concavity as shown in FIG. 3. The escape notches 15*b* in the first core 15 and the escape notches 16*a* in the second core 16 respectively communicate with the gaps.

A lower mold 2 has a shifting device 21 and a lower mold frame 22 that is rotatably connected to the shifting device 21. A male mold 23 is connected to the lower mold frame 22 and matched with the female mold 14. A tank 3 for receiving the paper pulp is located below the male mold 23. The male mold 23 includes a netted cover 24 and a porous inner core 25 that has apertures 26 and the inner core 25 is matched with the netted cover 24. The male mold 23 is emerged into the paper pulp that passes through the apertures 26 and is attached to an inside of the netted cover 24 by the suction force from the paths 11. A uniform thickness of the paper product is formed between the female mold 14 and the male mold 23 when the male mold 23 matches the female mold 14. Heating devices 14*a*, 23*a* are respectively equipped in the top mold 1 and the lower mold 2 so as to heat the female mold 14 and the male mold 23 respectively. The humidity escapes from the escape notches 15*b* and 16*a* via the gaps 19 and the paths 15*a* and 11. The gaps 19 are in a negative pressure status, which forms annular ridges on the edges of the paper products so that the paper products have smooth surfaces.

While we have shown and described the embodiment in accordance with the present invention, it should be clear to those skilled in the art that further embodiments may be made without departing from the scope of the present invention.

What is claimed is:

1. A mold assembly comprising:

a top mold having a top mold frame and connected to a driving device, a female mold connected to the top mold frame and a plurality of paths defined through the female mold, a concavity defined in the female mold and a first core connected to a recess in an inner periphery of the concavity of the female mold, a second core connected to a recess defined in the first core, a gap defined between the female mold and the first core and between the first core and the second core, the gaps located in communication with the concavity, the paths communicating with escape notches in the first core and escape notches in the second core, the escape notches in the first core and the escape notches in the second core respectively communicating with the gaps, and a lower mold having a male mold mateable with the female mold.

2. The mold assembly as claimed in claim 1 further comprising heating devices in the top mold and the lower mold to heat the female mold and the male mold respectively.

* * * * *